United States Patent
Matsumura et al.

(10) Patent No.: US 6,750,257 B2
(45) Date of Patent: Jun. 15, 2004

(54) COLLOIDAL SILICA SLURRY

(75) Inventors: Shigetoyo Matsumura, Osaka (JP); Yukio Okada, Osaka (JP); Tatsuo Manaki, Osaka (JP); Keiji Toyama, Kyoto (JP); Masatoshi Sakai, Kyoto (JP)

(73) Assignee: Fuso Chemical, Ltd., Osaka (JP)

( * ) Notice: Subject to any disclaimer, the term of this patent is extended or adjusted under 35 U.S.C. 154(b) by 41 days.

(21) Appl. No.: 09/761,043

(22) Filed: Jan. 15, 2001

(65) Prior Publication Data

US 2002/0037935 A1 Mar. 28, 2002

(30) Foreign Application Priority Data

Aug. 4, 2000 (JP) ........................................ 2000-236454

(51) Int. Cl.$^7$ .............................. B01F 3/12; C09K 3/14; C09G 1/02; C09G 1/04
(52) U.S. Cl. ................. 516/81; 51/308; 106/3
(58) Field of Search ............................ 516/81; 51/308; 106/3

(56) References Cited

U.S. PATENT DOCUMENTS

| | | | | | |
|---|---|---|---|---|---|
| 3,860,431 | A | * | 1/1975 | Payne et al. .................. | 516/34 |
| 3,901,987 | A | * | 8/1975 | Payne et al. .................. | 516/87 |
| 4,064,660 | A | * | 12/1977 | Lampert ....................... | 451/41 |
| 4,857,290 | A | * | 8/1989 | Shimizu ...................... | 423/339 |
| 4,973,462 | A | * | 11/1990 | Akira et al. ................. | 423/339 |
| 5,230,833 | A | * | 7/1993 | Romberger et al. ........... | 516/84 |
| 6,530,967 | B1 | * | 3/2003 | Misra .......................... | 51/307 |
| 6,626,967 | B2 | * | 9/2003 | Takami et al. ................ | 51/308 |
| 2001/0055942 | A1 | * | 12/2001 | Rhoades et al. .............. | 451/60 |
| 2002/0025762 | A1 | * | 2/2002 | Luo et al. .................... | 451/41 |

FOREIGN PATENT DOCUMENTS

| | | | |
|---|---|---|---|
| JP | 61 209909 A | * | 9/1986 |
| JP | 3-197575 | | 8/1991 |
| JP | 3-202269 | | 9/1991 |
| JP | 2001-20087 A | * | 1/2001 |

OTHER PUBLICATIONS

JPO on EAST, Patent Abstracts of Japan, Japan patent Office, JP02001020087A (Jan. 2001).*
Derwent Abstract on EAST, week 200123, London: Derwent Publications Ltd., AN 2001–221087, JP 2001020087 A (JSR Corp/Toshiba KK), abstract.*
Machine Translation of JP 2001–020087 A from www, Japan Patent Office,<http://www19.ipdl.jpo.go.jp/PA1/cgi-bin/PA1DETAIL>, (Jan. 2004) 9 total pages.*
Derwent Abstract on EAST, week 198644, London: Derwent Publications Ltd., AN 1986–287846, JP 61 209909 A, (TAMA Kagaku Kogyo KK), abstract.*

* cited by examiner

*Primary Examiner*—Daniel S. Metzmaier
(74) *Attorney, Agent, or Firm*—Dennis G. LaPointe; Mason Law, P.L.

(57) ABSTRACT

The present invention provides the colloidal silica slurry which does not have a bad influence, such as corrosion, to a silicon wafer and wiring material on a silicon wafer and inhibits growth of microbes, and whereof preserving stability is high because stability of particle diameters of a colloidal particle is superior and using for a long period continuously is possible. For providing the above, the colloidal silica slurry wherein hydrogen peroxide from 5 to 100 ppm is added.

5 Claims, No Drawings

COLLOIDAL SILICA SLURRY

BACKGROUND OF THE INVENTION

1. Field of the Invention

The present invention is related to colloidal silica slurry, and to say in detail, it is related the colloidal silica slurry that is preferably used as abrasive when a silicon wafer, which is for a board of a microcircuit, for example a transistor and a diode, an IC, and the like, and a surface of a semiconductor device which is wired and the like are abrasion and flat-treated to flatten. Its object is to provide the colloidal silica slurry which does not have a bad influence, such as corrosion, to a silicon wafer and wiring material on a silicon wafer and inhibits growth of microbes, and whereof preserving stability is high because stability of particle diameters of colloidal particle is superior and continuous use for a long period is possible.

2. Background Art

When a roughly cut silicon wafer is used as a board for completing a microcircuit, for example a transistor and a diode, an IC and the like, a surface of the silicon wafer generally requires to be abraded minutely.

Further, when wiring treatment and layering is carried out on the abraded surface of a silicon wafer, a surface of a layered semiconductor device requires to be abraded minutely and to be flattened.

For abrasive to abrade minutely these surfaces of the silicon wafer and the layered semiconductor device, colloidal silica slurry is used hitherto.

This colloidal silica slurry is circulated and recycled on the point of cost, but it will not be able to use as abrasive after it used for a long period because microbes, such as bacteria in the colloidal silica slurry, grow, and colorings, forming suspended matter and smelling are occurred. To prevent these, it is proposed that antibacterial material, for example sodium chlorite, hexachlorophene, dialdehyde such as glutaraldehyde, ethlenediamine, p-hydroxybenzoic acid methyl, sodium pentachlorophenate, formaldehyde, and 3,5-dimethyltetrahydro 1,3,5,2-H-thiadiazine-2-thions is added to the colloidal silica slurry.

However, the colloidal silica slurry wherein antibacterial materials are added may be one of the causes of the dispersion of impurities to a silicon wafer or corrosion of wiring material on a silicon wafer, and there is a problem that the colloidal silica slurry has a bad influence to electrical property. Also, it contains a lot of metal such as sodium so that there is a problem that it brings unpredictable change of electrical property.

Additionally, traditional antibacterial material as described above is never safe enough to humans and environment; therefore, a problem on disposal of used colloidal silica slurry remains.

This invention is invented in view of the above general circumstances. Its object is to provide the colloidal silica slurry where the growth of microbes is inhibited by adding hydrogen peroxide as antibacterial biocide, even with a little compounded amount, to the colloidal silica slurry. The effect can be maintained for a long period because stability of particle diameters of the colloidal particle is superior, and the colloidal silica slurry does not have a bad influence to electrical property as abrasive for a silicon wafer.

SUMMARY OF THE INVENTION

One embodiment of the present invention is the colloidal silica slurry wherein hydrogen peroxide from 5 to 100 ppm is added.

Another embodiment is the colloidal silica slurry as wherein hydrogen peroxide from 5 to 100 ppm is added and wherein the pH is from 6.0 to 8.0.

A third embodiment is the colloidal silica slurry wherein hydrogen peroxide from 5 to 100 ppm is added and wherein the colloidal silica is the lowered metal silica produced from silicate ester.

A fourth embodiment is the colloidal silica slurry wherein hydrogen peroxide from 5 to 100 ppm is added and wherein the pH is from 6.0 to 8.0, and the colloidal silica is the lowered metal silica produced from silicate ester.

A fifth embodiment relates to the first embodiment described above, wherein the metal content of said colloidal silica is 1 ppm or less.

The sixth embodiment relates to the second embodiment described above, wherein the metal content of said colloidal silica is 1 ppm or less.

A seventh embodiment relates to the third embodiment described above, wherein the metal content of said colloidal silica is 1 ppm or less.

An eighth embodiment of the present invention relates to the fourth embodiment described above, wherein the metal content of said colloidal silica is 1 ppm or less.

DETAILED DESCRIPTION OF THE INVENTION

Colloidal silica slurry related to the present invention is characterized by that hydrogen peroxide is used as antibacterial biocide which is an indispensable composition. By using hydrogen peroxide as an antibacterial biocide, it is possible to inhibit the growth of bacteria and/or microbes for a long period with low concentration.

The present invention is described hereinafter.

The colloidal silica slurry related to the present invention comprises colloidal silica slurry as the first indispensable composition and an antibacterial biocide as the second indispensable composition.

The colloidal silica slurry as the first indispensable composition in the colloidal silica slurry related to present invention is abrasive particles to abrade a surface of an object being abraded.

The colloidal silica slurry is sol whereof silica is micro-dispersed in water or organic solvent, and its preparation method is not limited particularly, and a wet method, a silica gel peptizing method, an ion exchange method, a hydrolysis method and the like can be exemplified.

In the present invention, metal content such as sodium of the colloidal silica is preferably a little, and to say it concretely, the metal content is preferably 1 ppm or less. This is because if the content of metal such as sodium is over 1 ppm, the content of metal of the colloidal silica slurry becomes high and electrical property of semiconductor parts may be had a bad influence.

In order to obtain the colloidal silica slurry having a little metal content, metal content such as sodium may be lowered in its preparation process or metal content such as sodium may be lowered by ion exchange process and the like after preparation Further, pH of the colloidal silica slurry is prepared being preferably a neutral zone from 6.0 to 8.0, more preferably from 6.5 to 7.5. This is because if the colloidal silica slurry is prepared by using the colloidal silica slurry which is out of the neutral zone, that is, the colloidal silica slurry which is an acid zone of pH less than 6.0 and an alkali zone of more than 8.0, it may cause corrosion of a silicon wafer and materials on a silicon, and may have a bad influence to electrical property of semiconductor parts.

Particularly in the present invention, using the colloidal silica, which comprises the lowered metal silica sol produced from high purity silica source such as silicate ester, is more preferable. This is because the metal content, such as sodium of the colloidal silica produced from these compounds, is approximately 1 ppm or less, and its pH is a neutral zone approximately 6.0 to 8.0.

The particle diameter of colloidal silica is not limited particularly, it is preferable to prepare such that the average of particle diameters is from 5 to 300 nm, more preferably from 10 to 250 nm. This is because if the average of particle diameters is less than 5 nm, it is impossible to get sufficient rate of abrading, and if it is more than 300 nm, roughness of surface of object being abraded will be remarkable so that smooth abraded surface can not be obtained; therefore, either case is not preferable.

The compounded amount of colloidal silica in the present invention is preferable to be prepared from 0.05 to 50 weight %, more preferably from 0.1 to 30 weight % per all amount of the colloidal silica slurry. This is because if the compounded amount is less than 0.05 weight %, the compounded amount of colloidal silica which is abrasive particles is too little to obtain practical rate of abrading; and if over 50 weight % is compounded, uniform dispersibility can not be held and that will be high coefficient of viscosity; therefore, either case is not preferable.

The antibacterial biocide as the second indispensable composition in the colloidal silica slurry related to present invention is compounded in order to prevent growth of bacteria and/or fungi in the colloidal silica slurry.

Hydrogen peroxide is used as the antibacterial biocide for the present invention. This is because that the hydrogen peroxide, even if it is a little amount, can inhibit growth of bacteria and/or fungi in the colloidal silica slurry for a long period. In addition, it is because that the hydrogen peroxide has high stability at a neutral zone where is a pH value of the colloidal silica slurry on the present invention and there is no anxiety to increase metal concentration such as sodium.

Further, the colloidal silica after compounding the hydrogen peroxide will not be a gel state so it can use as abrasive. Furthermore, even if the hydrogen peroxide is decomposed, the decomposition is oxygen and water, and is safe to humans and environment very much.

The compounded amount of antibacterial biocide is not limited but has to contain the concentration, which can inhibit growth of bacteria and fungi certainly; concretely, it is preferable to be prepared from 5 to 100 ppm, more preferably from 10 to 50 ppm per all amount of the colloidal silica slurry. This is because if the compounded amount of antibacterial biocide is less than 5 ppm, it is impossible to inhibit growth of bacteria and fungi certainly; and even if over 100 ppm is compounded, there is no more effect than that expected; therefore, either case is not preferable.

Each component as explained above is mixed, dissolved, or dispersed to water so that the colloidal silica slurry related to the present invention can be prepared. Further, for the water, it is preferable to use purified water such as ion exchange water, more preferably demineralized water.

In the colloidal silica slurry related to the present invention, which is prepared as above, the content of metal, such as sodium, is 1 ppm or less and the pH is maintained in a neutral zone from 6.0 to 8.0, preferably from 6.5 to 7.5. Consequently, the colloidal silica slurry related to the present invention deprives growth of microbes, and as an abrasive of silicon wafer, it does not have a bad influence to the electrical property of semiconductor.

Further, in the colloidal silica slurry related to the present invention, an abrasive promoter and the like may be compounded appropriately and optionally within not losing the effect in addition to the two indispensable compositions as described above.

Embodiment

Hereinafter, the present invention will be described more clearly with showing embodiments. Note that the present invention is not limited to the following embodiments.

TEST EXAMPLE 1

Decomposed Test 1 of Hydrogen Peroxide in the Colloidal Silica

Samples whereof 100 ppm, 50 ppm, 30 ppm, 20 ppm, and 10 ppm of hydrogen peroxide were added respectively to high purity colloidal silica (Product name: Quartron PL-10, Made by Fuso Chemical Co., Ltd.) were made. After they were preserved for one week at 37° C., 5 ml of each was extracted, 1 ml of vanadium sulfate was added to this, and remained amount of hydrogen peroxide was measured by (visual) comparing to the coloring of comparative samples prepared previously.

Furthermore, comparative samples were prepared by adding 1 ml of vanadium sulfate to 5 ml of samples whereof 100 ppm, 50 ppm, 30 ppm, 20 ppm, and 10 ppm of hydrogen peroxide were added respectively to colloidal silica.

This result is shown in table 1.

TABLE 1

| | Concentration of Hydrogen Peroxide (ppm) | | | | |
|---|---|---|---|---|---|
| Added concentration | 100 | 50 | 30 | 20 | 10 |
| Immediately after adding | 100 | 50 | 30 | 20 | 10 |
| One day later | 100~70 | 50~40 | 30~20 | 20~10 | 7~5 |
| One week later | 100~70 | 50~40 | 30~20 | 20~10 | 7~5 |
| Two weeks later | 100~70 | 50~40 | 30~20 | 20~10 | 7~5 |
| One month later | 100~70 | 50~40 | 30~20 | 20~10 | 7~5 |

As the result in Table 1, after the samples were preserved for one day under the condition of 37° C., the decomposition of hydrogen peroxide, although little, was observed. However, the decreasing of remained amount of hydrogen peroxide, which was passed one week, two weeks, and one month, was not observed. Therefore, the decomposition of hydrogen peroxide is observed a little in a short period; however, there is no more decomposition in a medium and long period so that the hydrogen peroxide is preferably used as antibacterial biocide of the colloidal silica slurry.

TEST EXAMPLE 2

Inhibiting Test 1 of Bacteria Growth by Adding Hydrogen Peroxide)

Samples, whereof 500 ppm, 100 ppm, 50 ppm, and 10 ppm of hydrogen peroxide were added respectively to 10 ml of high purity colloidal silica (Product name: Quartron PL-10, Made by Fuso Chemical Co., Ltd.) were made. 1 ml of bacteria (A number of bacteria: $5.1 \times 10^6$/ml) which was extracted from colloidal silica containing heat resistant sporocarp and the like was added. Each 1 ml was extracted and was measured a number of bacteria after it passed one week, two weeks, and one month.

Furthermore, each 1 ml of sterilized culture medium was added to each sample passed one month, then after it was cultivate for two days at 37° C., the existence of bacteria (final number of bacteria) in testing solution was examined.

Moreover each sample whereof 500 ppm, 100 ppm, 50 ppm, 10 ppm, and 5 ppm of hydrogen peroxide were added respectively to high purity colloidal silica (Product name: Quartron PL-10, Made by Fuso Chemical Co., Ltd.) was made, and each 1 ml of cultivation solution which is diluted to two stages (high concentration; $5.8 \times 10^3$ CFU/ml, low concentration; 58 CFU/ml) as same as the above is added to each sample. After it was passed one week, 1 ml of the culture medium was added, and the existence of growth of bacteria which passed two more days was measured. This result is shown in table 4.

TABLE 3

| | | | | | | | | | | | |
|---|---|---|---|---|---|---|---|---|---|---|---|
| | | | | | | (Unit: CFU/11 ml) | | | | | |
| | | Ammonia | | | | Hydrogen peroxide | | | | | |
| Bacteria solution | Blank | pH 9.5 | pH 10.0 | pH 10.5 | pH 11.0 | 500 ppm | 100 ppm | 50 ppm | 10 ppm | 5 ppm | 1 ppm |
| High concentration | 200< | 200< | 200< | 200< | 200< | 1 | 57 | 152 | 61 | 200< | 116 |
| Low concentration | 40 | 57 | 49 | 51 | 49 | 0 | 0 | 0 | 0 | 5 | 2 |

This result is shown in table 2.

TABLE 2

| | | | | | |
|---|---|---|---|---|---|
| | | (Unit: CFU/ml) | | | |
| | Added | hydrogen peroxide | | | |
| | concentration | 500 ppm | 100 ppm | 50 ppm | 10 ppm |
| Bacteria extracted from colloidal silica | One week later | 0 | 0 | 0 | 0 |
| | Two weeks later | 0 | 0 | 0 | 0 |
| | One month later | 0 | 0 | 0 | 0 |
| | Final number of bacteria | 0 | 0 | 0 | 0 |

As the result in Table 2, no bacterium was detected even after one month cultivation. Additionally after adding culture medium finally, bacterium was not detected at all. Therefore, the effect of hydrogen peroxide as antibacterial biocide can be maintained at low concentration for a long period.

TEST EXAMPLE 3

Inhibiting Test 2 of Bacteria Growth by Adding Hydrogen Peroxide)

Bacteria extracted from colloidal silica was added to a sample whereof hydrogen peroxide or ammonia was added to sterilized water, then how a number of bacteria changes was measured by adding hydrogen peroxide or pH adjustment with adding ammonia.

First, samples were made with adding ammonia or hydrogen peroxide to 10 ml of sterilized water respectively to become: for the ammonia, each pH value in table 3; and for the hydrogen peroxide, each concentration in table 3. Next, cultivation solution of bacteria extracted from colloidal silica was diluted to two stages (high concentration; $5.8 \times 10^3$ CFU/ml, low concentration; 58 CFU/ml), each 1 ml of the cultivation solution was added to each sample, and a number of bacteria passed one hour was measured with a filter filtration method. This result is shown in table 3.

TABLE 4

| Bacteria solution | | Hydrogen peroxide | | | | |
|---|---|---|---|---|---|---|
| | Blank | 500 ppm | 100 ppm | 50 ppm | 10 ppm | 5 ppm |
| High concentration | Growing | Not grown | Not grown | Not grown | Not grown | Not grown |
| Low concentration | Growing | Not grown | Not grown | Not grown | Not grown | Growing |

As the result in Table 3, even if the pH of sterilized water is adjusted by ammonia, growth of bacteria can not be inhibited. On the other hand, when hydrogen peroxide is added, it is found that growth of bacteria can be inhibited even with a little adding like 1 ppm.

Also, As the result in Table 4, when.hydrogen peroxide is added to colloidal silica, it is found that growth of bacteria can be inhibited with adding approximately 10 ppm or more of hydrogen peroxide.

TEST EXAMPLE 4

Preserving Test of Colloidal Silica Adding Antibacterial Biocide)

High purity colloidal silica (Product name: Quartron PL-10, Made by Fuso Chemical Co., Ltd.) wherein 10 ppm and 100 ppm of hydrogen peroxide were added respectively was preserved in sealed container under the condition of 25° C., and average of particle diameters and pH value, which passed 24 hours from adding hydrogen peroxide and which passed six months, were measured. The average of particle diameters was measured with using Sub-Micron Particle Analyzer (Product Name: Coulter Model N4, Made by Coulter Electronics, Inc.). Furthermore, high purity colloidal silica wherein hydrogen peroxide was not added was measured as a blank. This result is shown in table 5.

TABLE 5

|  | After 24 hours passed | | After 6 months passed | |
| --- | --- | --- | --- | --- |
| Added amount (ppm) | pH | Average of particle diameter (nm) | pH | Average of particle diameter (nm) |
| Hydrogen peroxide  10 | 7.1 | 220 | 6.9 | 221 |
| Hydrogen peroxide  100 | 7.0 | 221 | 6.8 | 220 |
| Blank  — | 7.1 | 221 | 6.8 | 219 |

As the result in Table 5, it is found that colloidal silica wherein hydrogen peroxide as antibacterial biocide is added, even it is preserved for a long period, is superior on preserving stability because it hardly affects to the average of particle diameters and pH value which are said that they are easy to be affected most.

Because the colloidal silica slurry related to the present invention comprises colloidal silica and hydrogen peroxide which is antibacterial biocide, it is possible to obtain the colloidal silica slurry, whereof growth of microbes is inhibited and preserving stability is superior, and which does not have a bad influence to electrical property and is preferably used as a circulatory system abrasive of a silicon wafer.

In addition, hydrogen peroxide, which is antibacterial biocide, can maintain the effect for a long period with a little compounded amount, and even if the hydrogen peroxide is decomposed, the decomposition is oxygen and water so it can be safe to humans and environment very much.

What is claimed is:

1. The colloid silica slurry wherein it does not have a bad influence, such as corrosion, to a silicon wafer and wiring material on a silicon wafer and inhibits growth of microbes, and whereof preserving stability is high because stability of a particle diameters of colloidal particle is superior and using for a long period continuously is possible, and said colloidal silica slurry is comprised by adding hydrogen peroxide 5 to 100 ppm to lowered metal silica slurry, which metal content is 1 ppm or less and produced from silicate ester, and the pH of colloidal silica slurry is 6.0 to 8.0 and content of colloidal silica is 0.05~50 weight %.

2. The colloidal silica slurry as claimed in claim 1, wherein pH is from 6.5 to 7.5.

3. The colloidal silica shiny as claimed in claim 1, wherein additional quantity of said hydrogen peroxide is from 10 to 50 ppm.

4. The colloidal silica slurry as claimed in claim 1, wherein an average particle diameter of said colloidal silica is from 5 to 300 nm.

5. The colloidal silica slurry as claimed in claim 1, wherein an average particle diameter of said colloidal silica is from 10 to 250 nm.

* * * * *